US011020921B2

(12) United States Patent
Lamgaday et al.

(10) Patent No.: US 11,020,921 B2
(45) Date of Patent: Jun. 1, 2021

(54) CONNECTING MEMBER FOR AN AIR MAINTENANCE TIRE AND METHOD OF FORMING THE SAME

(71) Applicant: The Goodyear Tire & Rubber Company, Akron, OH (US)

(72) Inventors: Robin Lamgaday, Wadsworth, OH (US); Cheng-Hsiung Lin, Hudson, OH (US); Dinesh Chandra, Hudson, OH (US); Arun Kumar Byatarayanapura Gopala, Copley, OH (US); Sagar Dilip Bafana, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 806 days.

(21) Appl. No.: 15/702,791

(22) Filed: Sep. 13, 2017

(65) Prior Publication Data
US 2018/0093436 A1  Apr. 5, 2018

Related U.S. Application Data

(60) Provisional application No. 62/403,288, filed on Oct. 3, 2016.

(51) Int. Cl.
*B29D 30/72* (2006.01)
*B60C 23/12* (2006.01)
*B29D 30/00* (2006.01)

(52) U.S. Cl.
CPC .............. *B29D 30/72* (2013.01); *B60C 23/12* (2013.01); *B29D 2030/0072* (2013.01); *B29D 2030/0083* (2013.01); *B29D 2030/0094* (2013.01)

(58) Field of Classification Search
CPC ............ B29C 65/70; B29C 2045/0093; B29C 2045/14139; B29C 2045/14368; B29C 45/14475; B29C 2045/1454
See application file for complete search history.

(56) References Cited

U.S. PATENT DOCUMENTS

| 1,050,886 A | 1/1913 | Wetherell |
| 1,134,361 A | 4/1915 | Wetherell |
| (Continued) | | |

FOREIGN PATENT DOCUMENTS

| DE | 3433318 | 3/1986 | |
| DE | 3723550 A1 * | 1/1988 | ....... B29C 45/14467 |
| (Continued) | | | |

OTHER PUBLICATIONS

Translation of DE 37 23 550 (Year: 1988).*
(Continued)

*Primary Examiner* — Marc C Howell
*Assistant Examiner* — John J DeRusso
(74) *Attorney, Agent, or Firm* — Edward T. Kennedy

(57) ABSTRACT

A connecting member and method of forming the connecting member in an air maintenance tire is provided. The method includes providing a tire having a sidewall formed with an annular groove. The groove receives an annular air tube having a first end with a first fitting and a second end with a second fitting. A recess is formed in the tire sidewall along the annular groove at a location where the first end of the annular air tube is adjacent the second end of the annular air tube. A mold formed with a cavity is provided and the fittings are removably secured in the cavity. The mold is positioned on a surface of the tire sidewall and an elastomer or a polymer is introduced into the mold cavity. The mold is heated to form the connecting member on the tire sidewall.

9 Claims, 5 Drawing Sheets

(56) References Cited

U.S. PATENT DOCUMENTS

| | | | |
|---|---|---|---|
| 1,428,241 A | 9/1922 | Kercher | |
| 1,624,974 A | 4/1927 | Putnam | |
| 1,682,922 A | 9/1928 | McKone | |
| 3,304,981 A | 2/1967 | Sheppard | |
| 3,833,041 A | 9/1974 | Glad et al. | |
| 4,922,984 A | 5/1990 | Dosjoub et al. | |
| 5,052,456 A | 10/1991 | Dosjoub | |
| 5,813,440 A * | 9/1998 | Bortoli | B29C 45/14311 139/449 |
| 5,813,728 A * | 9/1998 | Zigerlig | A46B 3/04 300/21 |
| 7,117,731 B2 | 10/2006 | Hrabal | |
| 8,042,586 B2 | 10/2011 | Losey et al. | |
| 8,113,254 B2 | 2/2012 | Benedict | |
| 8,602,820 B2 * | 12/2013 | Cortes Roque | B29C 45/14311 439/604 |
| 8,875,762 B2 | 11/2014 | Hinque et al. | |
| 8,915,277 B2 | 12/2014 | Hinque et al. | |
| 8,985,171 B2 | 3/2015 | Hinque et al. | |
| 8,991,456 B2 | 3/2015 | Gobinath | |
| 9,387,737 B2 | 7/2016 | Welter et al. | |
| 9,415,640 B2 | 8/2016 | Lin | |
| 2006/0099378 A1 * | 5/2006 | Wang | C09J 175/02 24/304 |
| 2008/0277926 A1 * | 11/2008 | Inman, Jr. | B29C 66/1224 285/123.15 |
| 2009/0294006 A1 | 12/2009 | Hrabal | |
| 2014/0043771 A1 * | 2/2014 | Isoda | H05K 7/02 361/728 |
| 2014/0130895 A1 | 5/2014 | Hinque et al. | |
| 2014/0174621 A1 | 6/2014 | Hinque et al. | |
| 2014/0317891 A1 * | 10/2014 | Steiner | C09J 175/02 24/304 |
| 2015/0059953 A1 | 3/2015 | Welter et al. | |
| 2015/0122390 A1 | 5/2015 | Durr | |
| 2015/0137420 A1 | 5/2015 | Hinque et al. | |
| 2015/0165838 A1 | 6/2015 | Benedict et al. | |
| 2015/0174800 A1 * | 6/2015 | Imamura | B41J 2/1637 156/245 |
| 2016/0200038 A1 * | 7/2016 | Gagne | B29C 45/14467 285/119 |
| 2017/0144492 A1 | 5/2017 | Lamgaday et al. | |
| 2017/0144493 A1 | 5/2017 | Lamgaday et al. | |
| 2017/0217260 A1 | 8/2017 | Lin et al. | |
| 2018/0154561 A1 * | 6/2018 | Katzin | F16L 41/082 |

FOREIGN PATENT DOCUMENTS

| | | |
|---|---|---|
| DE | 102007001279 A1 | 7/2008 |
| EP | 2985158 | 2/2016 |
| EP | 3012126 A1 | 4/2016 |
| RU | 2106978 | 3/1998 |
| SE | 183890 | 5/1963 |
| WO | 2003049958 | 6/2003 |
| WO | 2005012009 A1 | 7/2004 |
| WO | 2007134556 | 11/2007 |
| WO | 2010008338 A1 | 1/2010 |

OTHER PUBLICATIONS

EPO search report received by Applicant dated Jan. 31, 2018.
Chinese search report received by applicant Mar. 6, 2019.
Korean search report received by applicant Mar. 26, 2019.

* cited by examiner

CONNECTING MEMBER FOR AN AIR MAINTENANCE TIRE AND METHOD OF FORMING THE SAME

FIELD OF THE INVENTION

The invention relates to air maintenance tire systems, which are systems that maintain appropriate air pressure within a pneumatic tire. More specifically, the invention relates to a connecting member of a valve stem-based air maintenance tire system. The invention is directed to a durable connecting member and an efficient and reliable method for forming the connecting member in a sidewall of a tire.

BACKGROUND OF THE INVENTION

Conventional pneumatic tires are designed to perform for relatively long periods of time. In many cases, automobile tires are now expected to have a useful service life of 30,000, 50,000 or 70,000 miles. However, even long-life pneumatic tires are subject to air pressure losses due to puncture by nails and other sharp objects, temperature changes, and/or diffusion of air through the tire itself.

Since air diffusion reduces tire pressure over time, the pneumatic tires may repeatedly become underinflated. Accordingly, drivers must in turn repeatedly act to maintain recommended air pressures in the vehicle tires to avoid reduced fuel economy, tire life, and/or vehicle braking and handling performance. Tire pressure monitoring systems (TPMS) are automated systems that have been proposed to warn drivers when the air pressure in the vehicle tires is significantly low. Such systems, however, remain dependent upon a driver taking remedial action, when warned, to re-inflate a tire to the recommended pressure. It had thus been desirable in the prior art to incorporate an air maintenance feature within a pneumatic tire that would maintain a predetermined or recommended air pressure without requiring driver intervention.

To this end, air maintenance tire (AMT) systems have been developed. An AMT system typically includes one or more pumps or pumping assemblies that act to increase the air pressure in the vehicle tires as needed. An example of one such system is a valve stem-based air maintenance tire system described in U.S. patent application Ser. No. 15/065,134, which is owned by the same Assignee as the present invention, that is, The Goodyear Tire & Rubber Company.

In such AMT systems, and particularly valve stem-based AMT systems, an annular air tube is disposed in a sidewall of the tire and is sequentially flattened or squeezed by the tire footprint as the tire rotates, which directs air to a valve housing. The valve housing is disposed within a wheel rim and is fluidly connected to a tire valve stem, which in turn is in fluid communication with the tire cavity. To enable the fluid communication of air from the annular air tube to the valve housing, one or more connecting tubes extend between the annular air tube and the valve housing. To provide a secure connection point between the annular air tube and the connecting tubes, a mounting member is secured to the sidewall of the tire.

The mounting member is often referred to as a dome. The dome is an important part of a valve-stem based AMT system, as it preserves the fluid connection between the annular air tube and the connecting tubes. In the prior art, the dome has been pre-formed and then separately attached to the sidewall of the tire. Such a manner of forming and securing the dome to the tire sidewall is inefficient and may not provide optimum reliability.

It is therefore desirable to provide a durable connecting member and an efficient and reliable method for forming the connecting member in an air maintenance tire.

SUMMARY OF THE INVENTION

According to an aspect of an exemplary embodiment of the invention, a method of forming a connecting member in an air maintenance tire includes providing a tire with a sidewall. The sidewall is formed with an annular groove that receives an annular air tube and the annular air tube includes a first end receiving a first fitting and a second end receiving a second fitting. A recess is formed in the tire sidewall along the annular groove at a location where the first end of the annular air tube is adjacent the second end of the annular air tube. A mold is provided that is formed with a cavity. The first fitting is removably secured in the cavity and the second fitting is removably secured in the cavity. The mold is positioned on a surface of the tire sidewall and at least one of an elastomer and a polymer is introduced into the mold cavity. The mold is heated and the connecting member is formed on the tire sidewall.

According to an aspect of another exemplary embodiment of the invention, a connecting member is provided and is formed according to the exemplary steps described in the paragraph above.

BRIEF DESCRIPTION OF THE DRAWINGS

The invention will be described by way of example and with reference to the accompanying drawings, in which.

Similar numerals refer to similar parts throughout the drawings.

DETAILED DESCRIPTION OF THE INVENTION

It is to be understood that the term inboard or inboardly is referred to herein as a direction corresponding to the axially inner surface or side of a tire, and the term outboard or outboardly is referred to herein as a direction corresponding to the axially outer surface or side of a tire. The term axially inwardly refers to an axial direction that is toward the center plane of a tire, and the term axially outwardly refers to an axial direction that is away from the center plane of a tire. The term radially inwardly refers to a radial direction that is toward the central axis of rotation of a tire, and the term radially outwardly refers to a radial direction that is away from the central axis of rotation of a tire.

Figure 1:
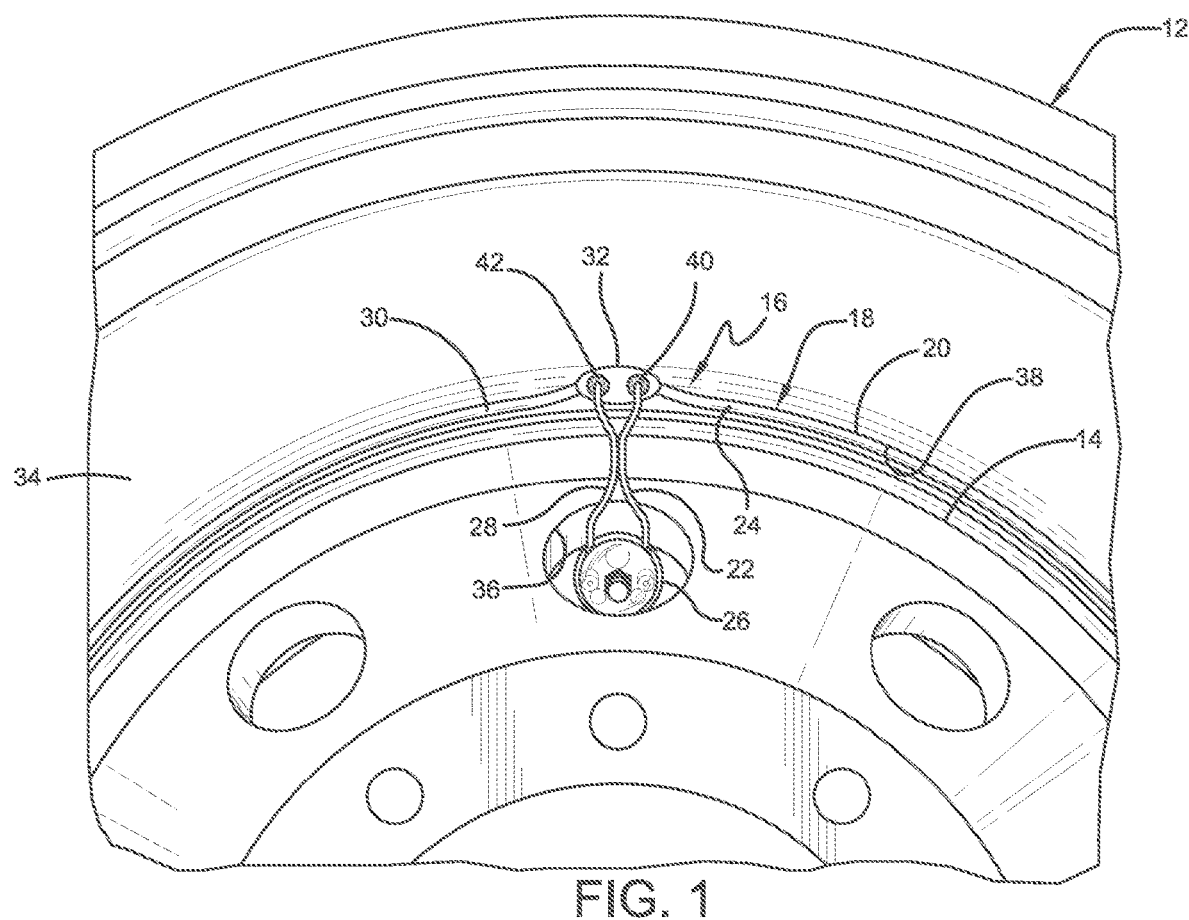
FIG. 1 is a fragmentary elevational view of an outboard side of a tire including components of a valve stem-based air maintenance tire system.

Turning to FIG. 1, a tire 12 is mounted on a rim 14 in a conventional manner as known to those skilled in the art and defines a cavity (not shown). An exemplary air maintenance tire system, such as a valve stem-based air maintenance tire system, is indicated at 16. The air maintenance tire system 16 includes a peristaltic pump assembly 18. The peristaltic pump assembly 18 includes an annular air tube 20 that is received in an annular groove 38 formed in a sidewall 34 of the tire 12 and/or rim 14, and in turn encloses an annular passageway (not shown).

A first connecting tube 22 attaches to a first end 24 of the annular air tube 20 and fluidly connects the first end of the annular air tube to a valve housing 26 of the pump assembly 18. A second connecting tube 28 attaches to a second end 30 of the annular air tube 20 and fluidly connects the second end of the annular air tube to the valve housing 26.

When the tire 12 rotates under load along a ground surface, the annular air tube 20 is sequentially flattened or squeezed at the tire footprint. The sequential flattening of the annular air tube 20 and its passageway, segment by segment, directs air to the valve housing 26. A tire valve stem (not shown), including a check valve, is fluidly connected to the valve housing 26 and is in fluid communication with the tire cavity. When the air pressure is sufficient against the check valve and the air pressure within the tire cavity is below a set pressure level, air passes into the tire cavity. When the air pressure level within the tire cavity is at or above the set pressure, the check valve closes and air from the pump assembly 18 is vented by a relief valve in the valve housing 26 to atmosphere.

As seen in FIG. 1, the valve housing 26 of the pump assembly 18 is disposed within the rim 14. The connecting tubes 22, 28 pass through an opening 36 formed in the rim 14 and extend to a fairly rigid elastomer or polymer mounting member 32, which is referred to as a dome. The dome 32 is secured to the sidewall 34 of the tire 12, and facilitates the fluid connection of the first connecting tube 22 to the first end 24 of the annular air tube 20 through a first fitting 40 and the fluid connection of the second connecting tube 28 to the second end 30 of the annular air tube through a second fitting 42. In the prior art, the dome 32 has been pre-formed and then separately attached to the tire sidewall 34, which is inefficient and may not provide optimum reliability.

Figure 6:
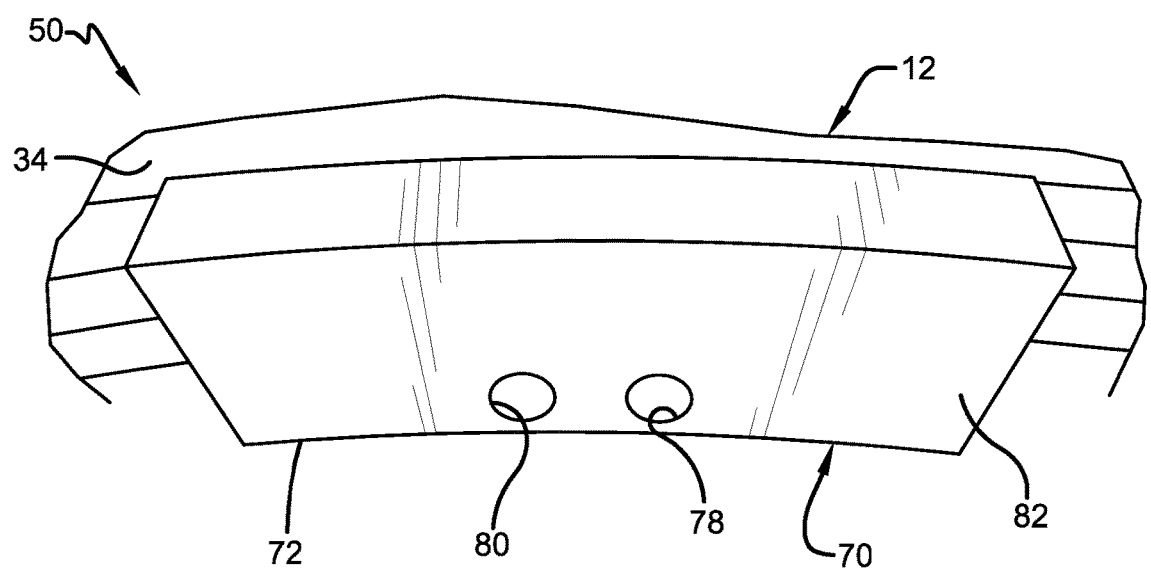
FIG. 6 is a perspective view of the exterior surface of the mold shown in FIG. 5.
Figure 7:
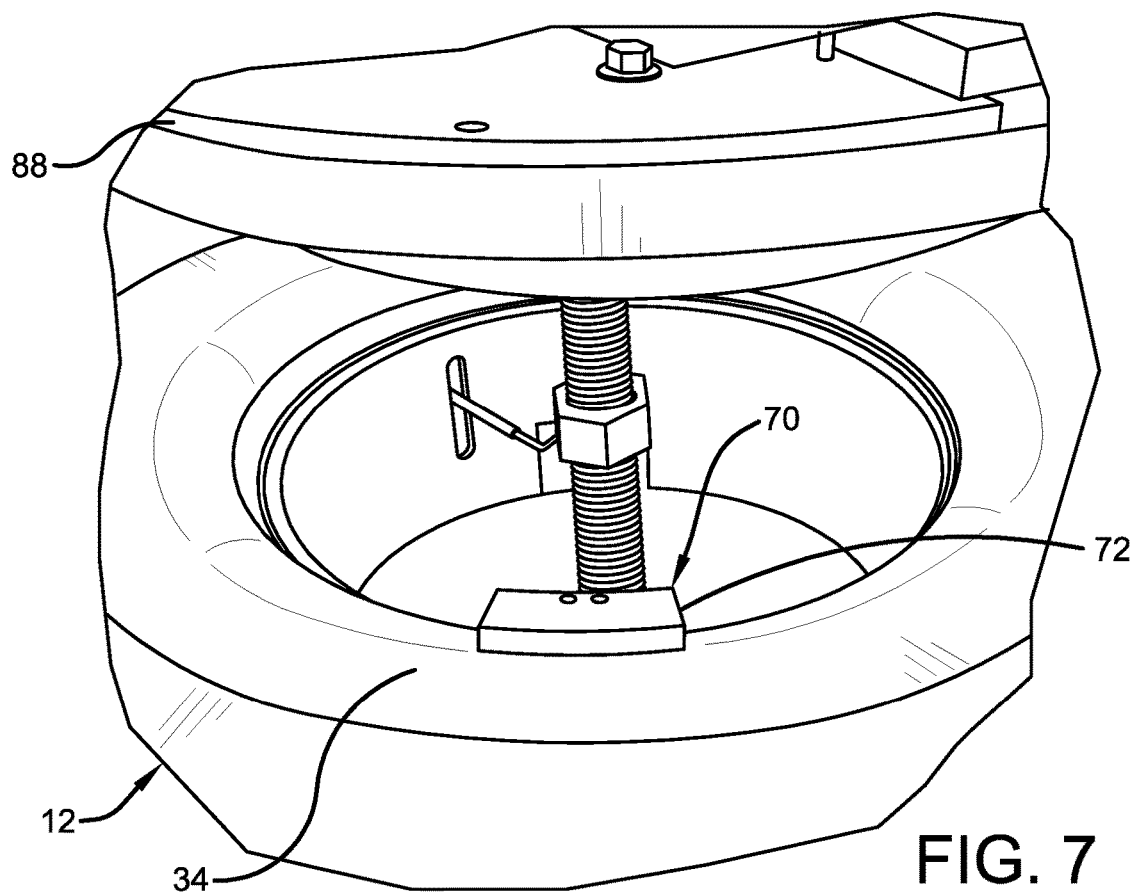
FIG. 7 is a fragmentary perspective view of the mold shown in FIG. 6 as disposed on the tire shown in FIG. 2.
Figure 8:
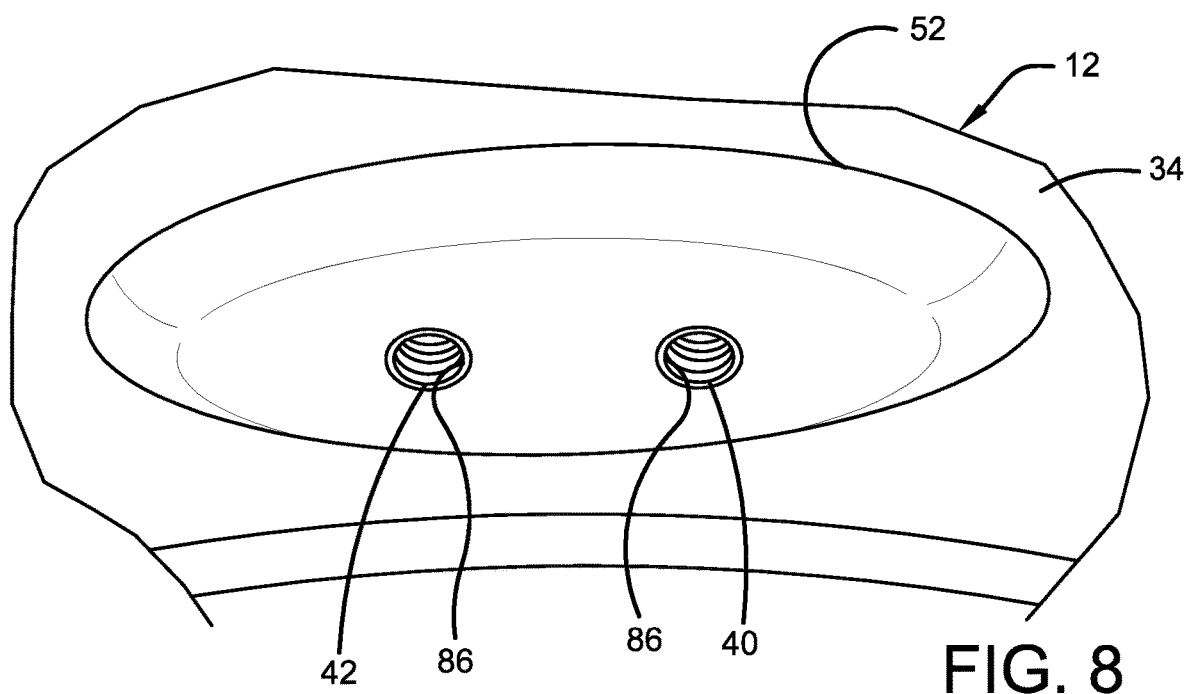
FIG. 8 is a fragmentary perspective view of a connecting member of the present invention as formed on the tire shown in FIG. 2.

The connecting member and method of forming the connecting member in an air maintenance tire of the present invention is referred to generally at 50 and is shown in FIGS. 2 through 8. An exemplary connecting member 52, also referred to as a dome, formed by the method 50 of the present invention is shown in FIG. 8. For the purpose of convenience, the numbering of components in FIGS. 2 through 8, with the exception of dome 52, will remain consistent with the numbering of components in FIG. 1.

Figure 2:
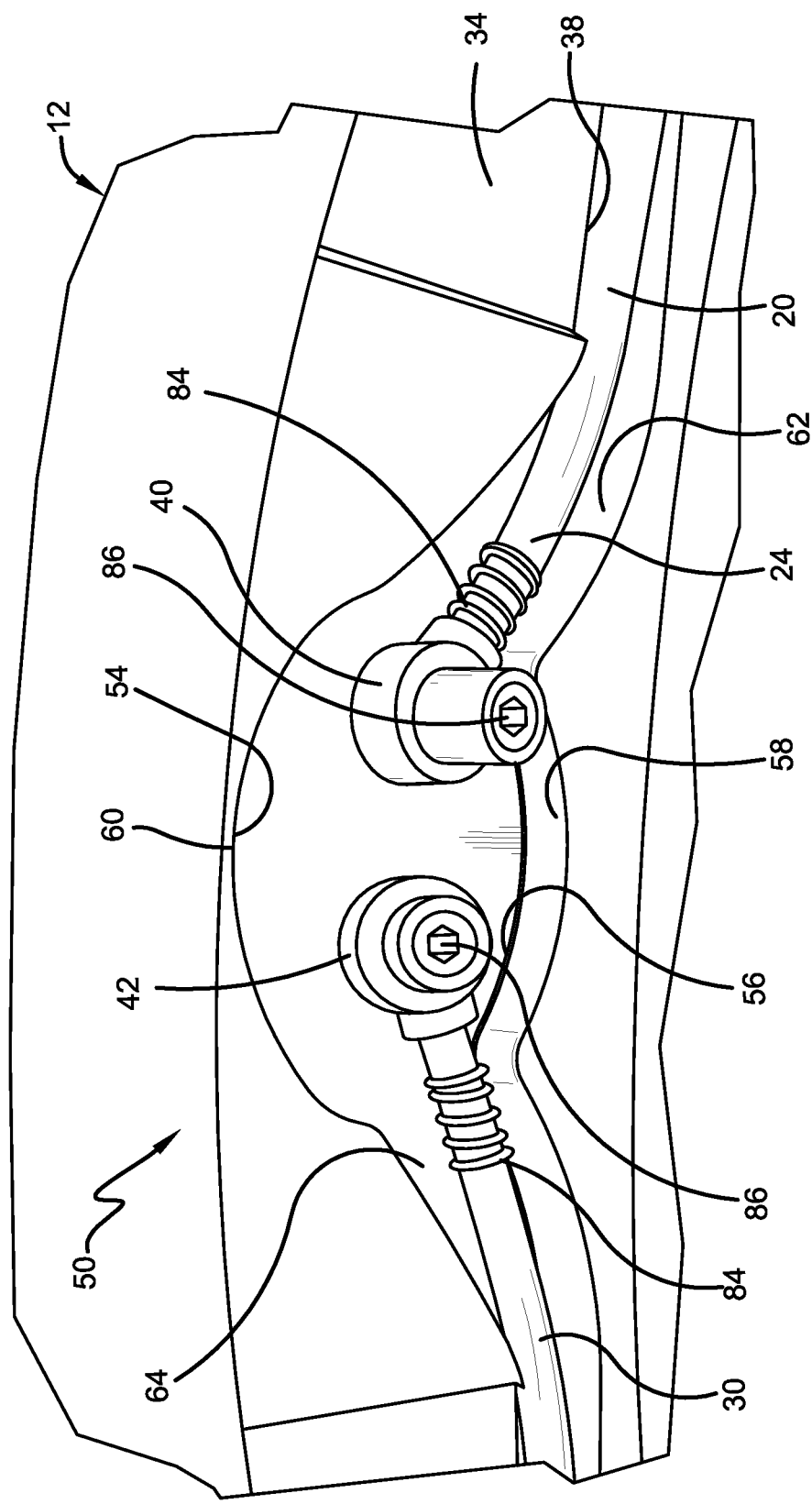
FIG. 2 is a fragmentary perspective view of an outboard side of a tire showing a recess formed in the tire sidewall, as included in an exemplary embodiment of the connecting member for an air maintenance tire and method of forming the same of the present invention.

Turning now to FIG. 2, the connecting member and method of forming the connecting member in an air maintenance tire 50 includes forming a recess 54 in the tire sidewall 34 at a predetermined point along the annular groove 38. More particularly, the recess 54 is formed at the location where the first end 24 of the annular air tube 20 is adjacent the second end 30 of the annular air tube. The first fitting 40 and the second fitting 42 each are received in the recess 54. The recess 54 is of a sufficient depth to receive the fittings 40 and 42, while not intruding upon the tire cavity. The recess 54 preferably is formed in the tire 12 after the tire has been cured or vulcanized.

An undercut 56 preferably is formed about the radially inward periphery 58 of the recess 54 and the radially outward periphery 60 of the recess. The undercut 56 enables mechanical engagement of the dome 52 (FIG. 8) with the tire sidewall 34, as will be described in greater detail below. A first relief area 62 preferably is formed adjoining the recess 54 along the annular groove 38 about the first end 24 of the annular tube 20, and a second relief area 64 preferably is formed adjoining the recess along the annular groove about the second end 30 of the annular tube. Each relief area 62 and 64 enables easy temporary elevation of the fittings 40 and 42 away from the annular groove 38 for the formation of the dome 52, as will be described in greater detail below.

Figure 3:
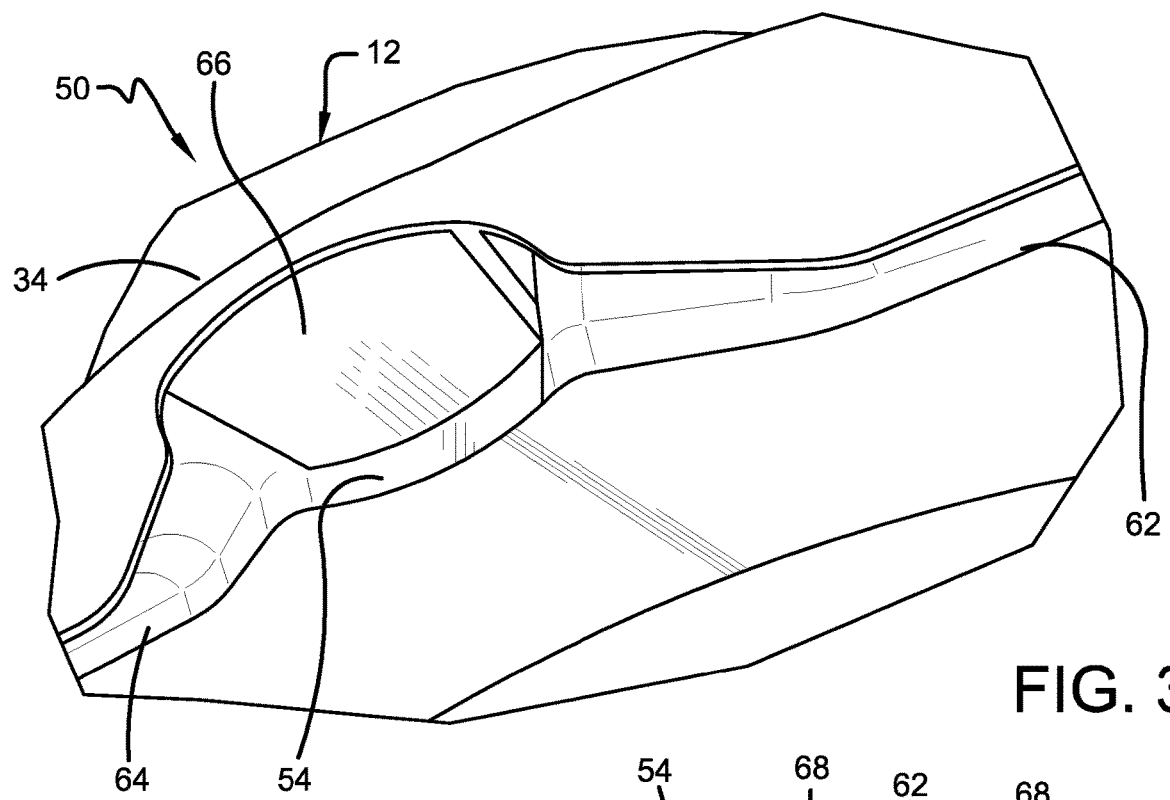
FIG. 3 is a fragmentary perspective view of an adhesive patch disposed in the recess shown in FIG. 2.
Figure 4:
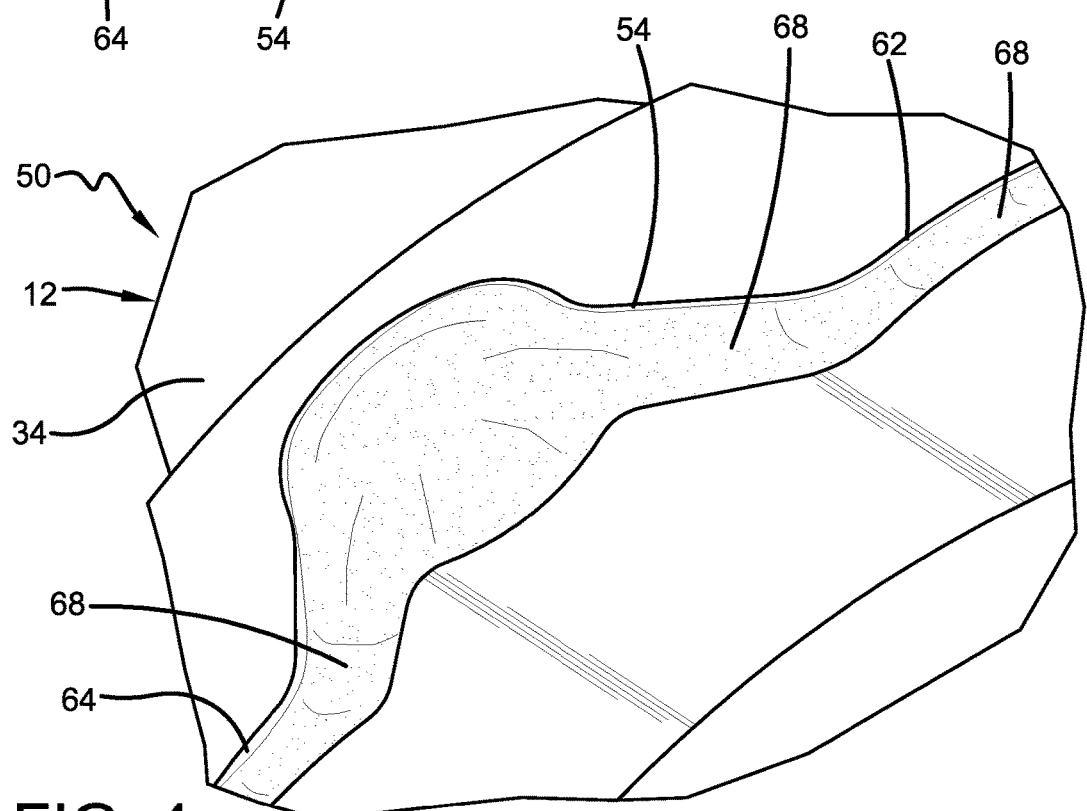
FIG. 4 is a fragmentary perspective view of a flowable adhesive disposed in the recess shown in FIG. 2.

Referring to FIGS. 3 and 4, the fittings 40 and 42 (FIG. 2) are temporarily moved out of the recess 54. Adhesive material such as a solid adhesive 66, including an adhesive or rubber patch 66 (FIG. 3), and/or a flowable adhesive 68 (FIG. 4), including rubber cement, glue, epoxy and the like, is introduced into the recess 54. Preferably the flowable adhesive 68 is also introduced into the first relief area 62 and the second relief area 64.

Figure 5:
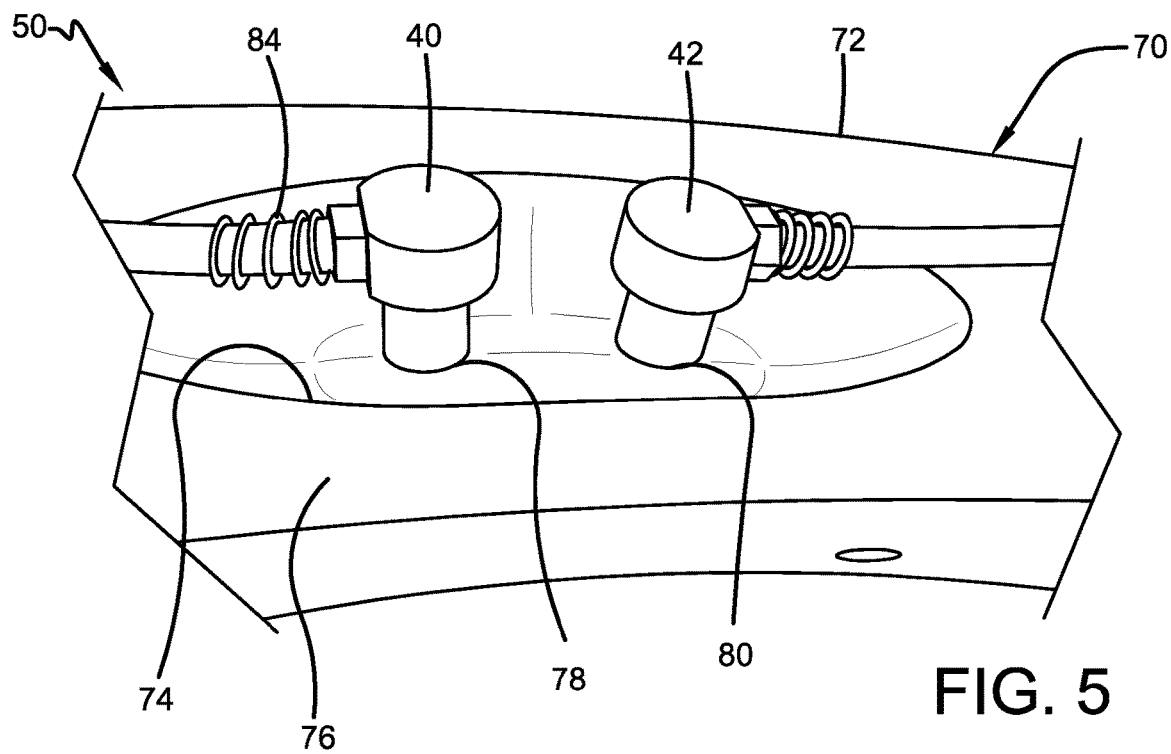
FIG. 5 is a fragmentary perspective view of the interior surface of a mold to which nozzles are removably secured, as included in an exemplary embodiment of the connecting member for an air maintenance tire and method of forming the same of the present invention.

As shown in FIG. 5, when the fittings 40 and 42 are moved out of the recess 54, they are removably secured to a mold 70. More particularly, the mold 70 includes a mold body 72 that includes an interior surface 76 formed with a cavity 74. The cavity 74 is sized to cover the recess 54 and the relief areas 62, 64 (FIG. 2). Each one of a pair of openings 78 and 80 are formed in the mold body 72 and extend from the cavity 74 to an exterior surface 82 (FIG. 6) of the mold body. The first fitting 40 is inserted into a respective one of the openings 78 and the second fitting 42 is inserted into the other respective one of the openings 80. The fittings 40 and 42 are preferably formed of a rigid material, such as brass, copper, steel or other metal, or of a rigid, high-melting point plastic or composite. By being formed of such materials, the fittings 40 and 42 are robust and firmly engage the openings 78 and 80 during curing of the dome 52, as will be described in greater detail below. It is to be understood that the fittings 40 and 42 may be of various constructions and may include supporting features, such as hose-supporting springs 84.

The openings 78 and 80 formed in the mold body 72 thus secure the relative position of each fitting 40 and 42 in the mold cavity 74, and prevent material from flowing into a pneumatic opening 86 (FIG. 8) of each respective fitting. Such prevention of material flow into each pneumatic opening 86 preserves fluid communication between the connecting tubes 22, 28 (FIG. 1) and the annular tube 20. Once the fittings 40 and 42 are inserted into respective openings 78 and 80, a selected elastomer or polymer is introduced into the mold cavity 74. The elastomer or polymer may be in a solid form, such as pellets, strips or particulate matter, and packed into the mold cavity 74 before the mold body 72 is placed into contact with the tire 12. Alternatively, the elastomer or polymer may be in a molten or flowable form, and may thus be flowed into the mold cavity after the mold body 72 is placed into contact with the tire 12.

Turning now to FIGS. 6 and 7, the mold body 72 is positioned on the surface of the tire sidewall 34. When the mold body 72 is positioned on the tire sidewall 34, the fittings 40 and 42 are seated in the recess 54 (FIG. 2), the first end 24 of the annular tube 20 is seated in the first relief area 62 and the second end 30 of the annular tube is seated in the second relief area 64. The mold body 72 preferably is secured in position against the sidewall 34 of the tire 12 by mechanical means, such as fasteners or dowel pins. A platen 88 (FIG. 7) is placed into contact with the mold body 72 to provide pressure and/or heat to the mold 70.

The mold body 72 remains in contact with the tire sidewall 34 as forming and curing of the dome 52 takes place. The pressure created in the mold cavity 74, the temperature created in the mold cavity and the amount of time that the mold body 72 is pressed against the tire sidewall 34 are all dictated by the specific elastomer or polymer that is selected for introduction into the mold cavity. For example, for most elastomers or polymers that may be is introduced into the mold cavity 74, the temperature in the cavity may be from about 150 to about 170 degrees Celsius and the molding time may be from about fifteen to about thirty minutes.

During the molding process, the elastomer or polymer in the mold cavity 74 flows about the fittings 40 and 42 in the cavity and the recess 54, and combines with the solid adhesive 66 and the flowable adhesive 68 to form the dome 52 shown in FIG. 8. In this manner, the dome 52 is formed as an integral component on the tire sidewall 34. The flowing of the elastomer, polymer and/or adhesive into the undercut 56 about the recess 54 creates a positive mechanical interlock of the dome 52 and the tire sidewall 34. The dome 52 is further secured to the tire sidewall 34 by the adhesive 64, 68.

The connecting member and method of forming the connecting member in an air maintenance tire 50 is efficient and reliable and produces a durable dome 52. The dome 52 includes a semi-rigid structure that is capable of flexing when needed, while being a stable structure that is formed on and securely attached to the sidewall 34 of the tire 12. Such a stable structure for the dome 52 preserves the connection of the annular air tube 20 to the connecting tubes 22 and 28 and maintains the integrity of the connection as the tire 12 rotates.

As described above, the present invention includes a method of forming a connecting member in an air maintenance tire 50. The method includes steps in accordance with the description that is presented above and shown in FIGS. 2 through 8.

It is to be understood that the structure of the above-described connecting member and/or the steps of the above-described method of forming the connecting member in an air maintenance tire may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A method of forming a connecting member in an air maintenance tire, the method comprising the steps of:
    providing a tire that includes a sidewall, the sidewall being formed with an annular groove which receives an annular air tube, the annular air tube including a first end receiving a first fitting and a second end receiving a second fitting;
    forming a recess in the tire sidewall along the annular groove at a location where the first end of the annular air tube is adjacent the second end of the annular air tube;
    providing a mold being formed with a cavity, the mold being formed with openings extending from the cavity to an exterior surface of the mold;
    removably securing the first fitting in a selected one of the openings in the cavity and removably securing the second fitting in another selected one of the openings in the cavity;
    positioning the mold on a surface of the tire sidewall;
    placing a platen into contact with the mold to provide at least one of pressure and heat to the mold, free of a tire vulcanizing mold;
    introducing at least one of an elastomer and a polymer into the mold cavity; and
    heating the mold, whereby the connecting member is formed on the tire sidewall.

2. The method of forming a connecting member of claim 1, further comprising the step of introducing adhesive material into the recess.

3. The method of forming a connecting member of claim 2, wherein the adhesive includes at least one of a solid adhesive and a flowable adhesive.

4. The method of forming a connecting member of claim 1, further comprising the step of forming an undercut in the tire sidewall about at least one of the radially inward periphery of the recess and the radially outward periphery of the recess.

5. The method of forming a connecting member of claim 1, further comprising the step of forming a first relief area in the tire sidewall adjoining the recess along the annular groove.

6. The method of forming a connecting member of claim 5, further comprising the step of forming a second relief area in the tire sidewall adjoining the recess along the annular groove.

7. The method of forming a connecting member of claim 6, wherein, when the mold is positioned on the surface of the tire sidewall, the first and second fittings seat in the recess, the first end of the annular tube seats in the first relief area and the second end of the annular tube seats in the second relief area.

8. The method of forming a connecting member of claim 1, wherein the at least one of an elastomer and a polymer is in a solid form.

9. The method of forming a connecting member of claim 1, wherein the at least one of an elastomer and a polymer is in a flowable form.

* * * * *